(12) United States Patent
Granddidier et al.

(10) Patent No.: US 12,743,558 B2
(45) Date of Patent: Sep. 22, 2026

(54) SECURE MODULE, ELECTRONIC PAYMENT TERMINAL, CORRESPONDING DETECTION METHOD

(71) Applicant: BANKS AND ACQUIRERS INTERNATIONAL HOLDING, Suresnes (FR)

(72) Inventors: Yann Granddidier, Lemps (FR); Jérôme Andre, Montoison (FR)

(73) Assignee: BANKS AND ACQUIRERS INTERNATIONAL HOLDING, Suresnes (FR)

( * ) Notice: Subject to any disclaimer, the term of this patent is extended or adjusted under 35 U.S.C. 154(b) by 475 days.

(21) Appl. No.: 18/035,364

(22) PCT Filed: Nov. 2, 2021

(86) PCT No.: PCT/EP2021/080403
§ 371 (c)(1),
(2) Date: May 4, 2023

(87) PCT Pub. No.: WO2022/096463
PCT Pub. Date: May 12, 2022

(65) Prior Publication Data

US 2024/0012952 A1 Jan. 11, 2024

(30) Foreign Application Priority Data

Nov. 4, 2020 (FR) ....................................... 2011312

(51) Int. Cl.
*G06F 21/86* (2013.01)

(52) U.S. Cl.
CPC .................................... *G06F 21/86* (2013.01)

(58) Field of Classification Search
CPC ....................................................... G06F 21/86
USPC ......................................................... 713/194
See application file for complete search history.

(56) References Cited

U.S. PATENT DOCUMENTS

| | | | | |
|---|---|---|---|---|
| 2013/0058057 | A1* | 3/2013 | Takemori | G06F 21/86 361/749 |
| 2016/0224807 | A1* | 8/2016 | Lee | G06F 21/83 |
| 2018/0068135 | A1* | 3/2018 | Roux | G06F 21/83 |
| 2019/0311159 | A1* | 10/2019 | Hernandez | G06F 21/86 |

(Continued)

OTHER PUBLICATIONS

Feb. 24, 2022 International Search Report issued in International Patent Application No. PCT/EP2021/080403.

*Primary Examiner* — Dereena T Cattungal
(74) *Attorney, Agent, or Firm* — Oliff PLC

(57) ABSTRACT

A secure module of an electronic payment terminal including a housing, including first and second printed circuits each having an inner side located facing each other with electronic components, and a flexible printed circuit extending from the first to second printed circuit on part of their perimeter and forming, with the printed circuits, a secure enclosure for the components, the secure module including a secure element extending from the first or second printed circuit, on which it is connected to a circuit for detecting opening of the housing, to the second printed circuit respectively the first printed circuit, facing a slot passing through the second printed circuit, respectively the first printed circuit, via which a secure element comes into contact with the upper or lower cover of the closed housing.

17 Claims, 7 Drawing Sheets

(56) References Cited

U.S. PATENT DOCUMENTS

2023/0130104 A1* 4/2023 Iruvanti ................ H01L 23/562
257/713
2025/0098062 A1* 3/2025 Buchling Rego .... H05K 5/0208

* cited by examiner

[Fig. 1a]
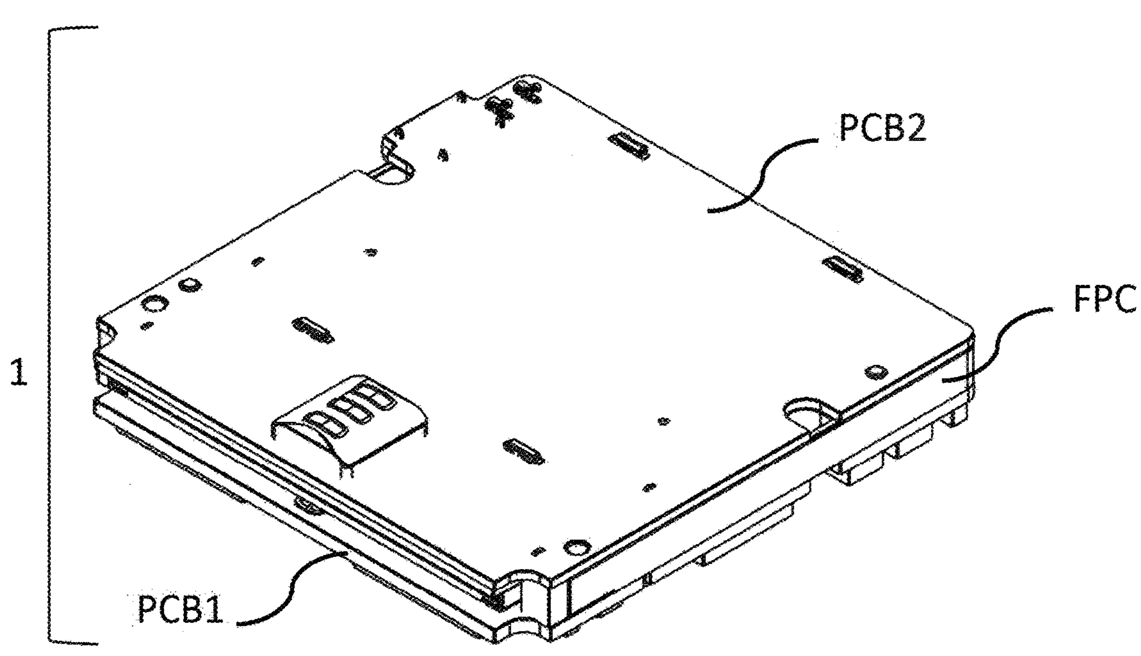
[Fig. 1b]
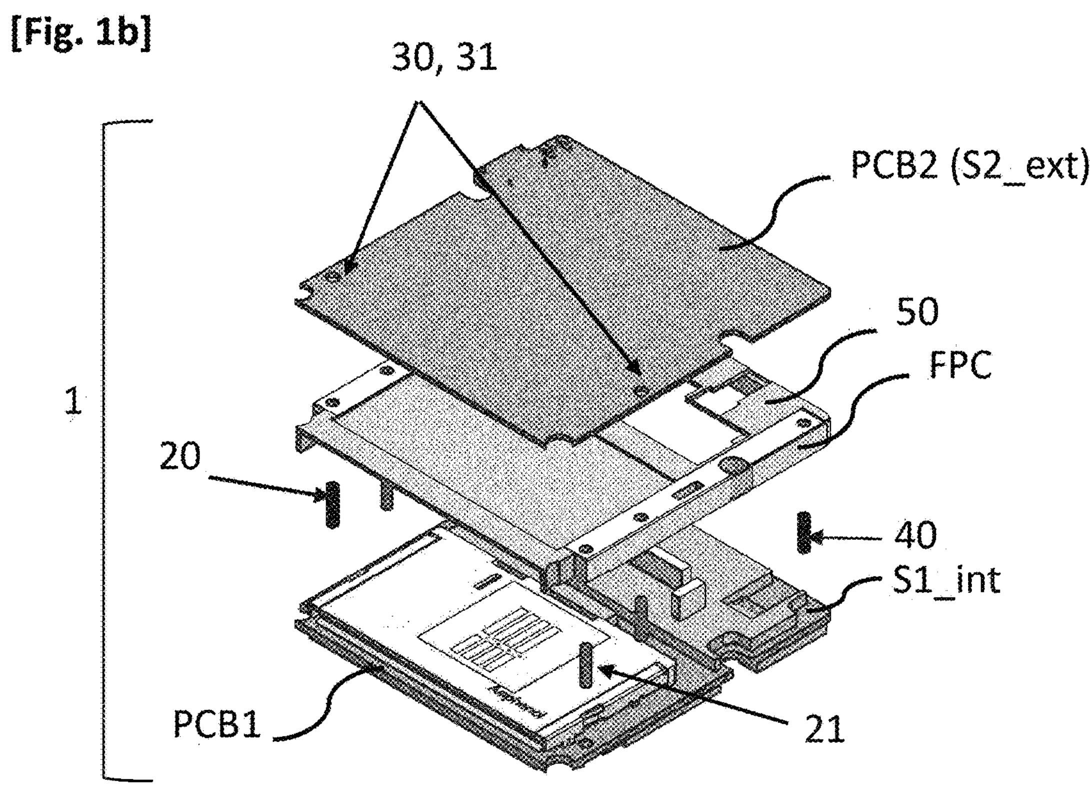

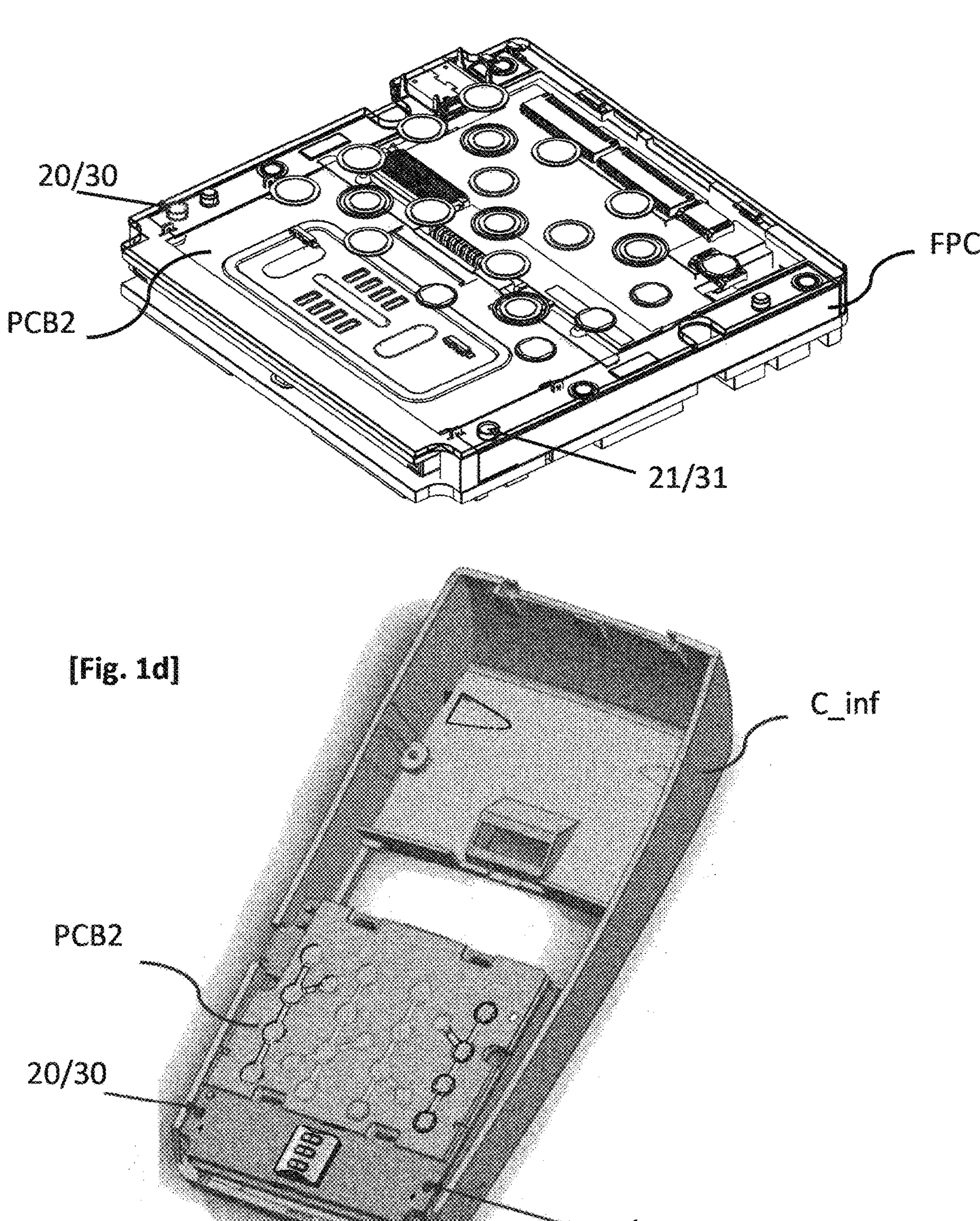
[Fig. 1c]
20/30
PCB2
FPC
21/31
[Fig. 1d]
C_inf
PCB2
20/30
21/31

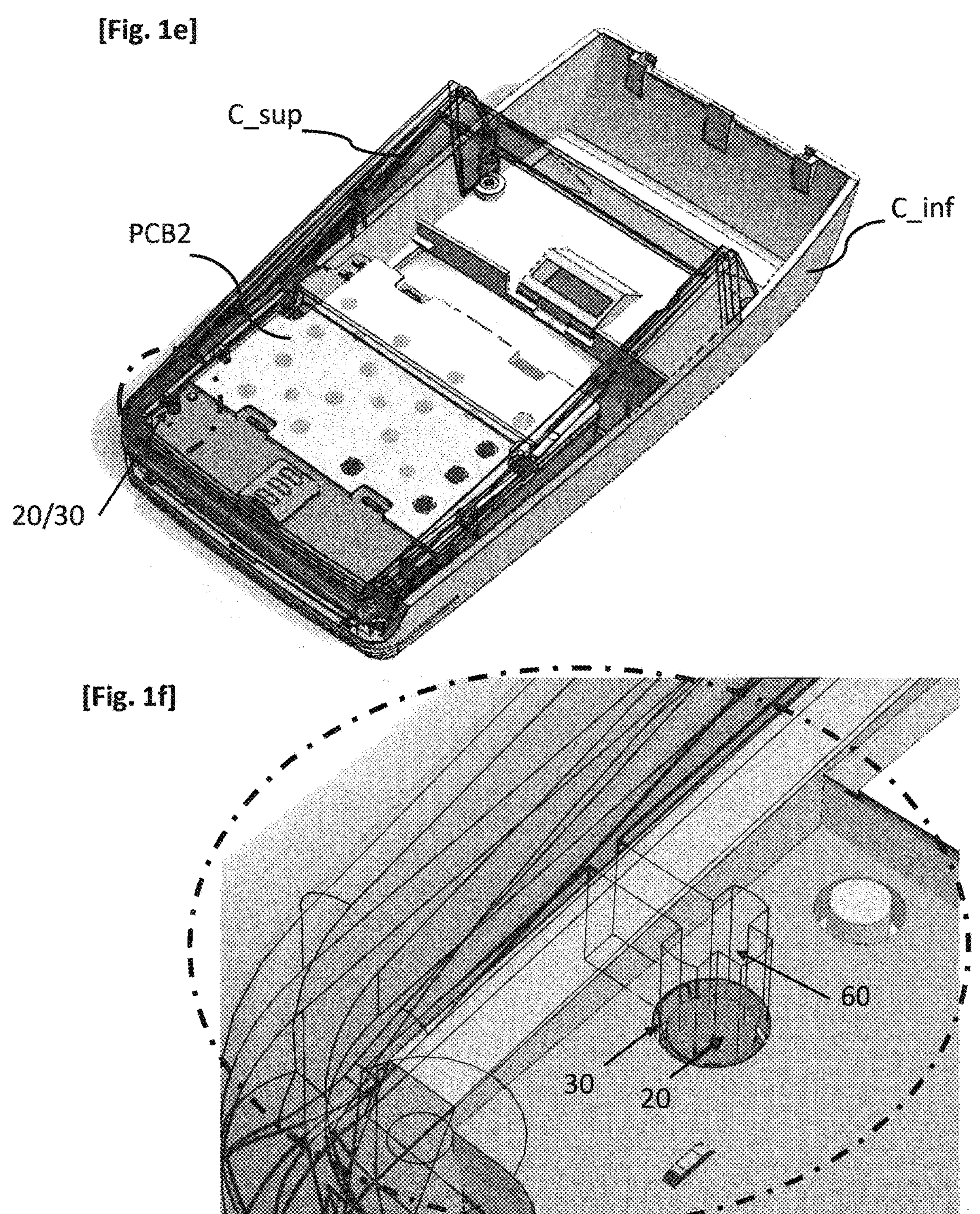
[Fig. 1e]
C_sup
PCB2
C_inf
20/30
[Fig. 1f]
60
30
20

[Fig. 1g]

[Fig. 1h]

[Fig. 2a]
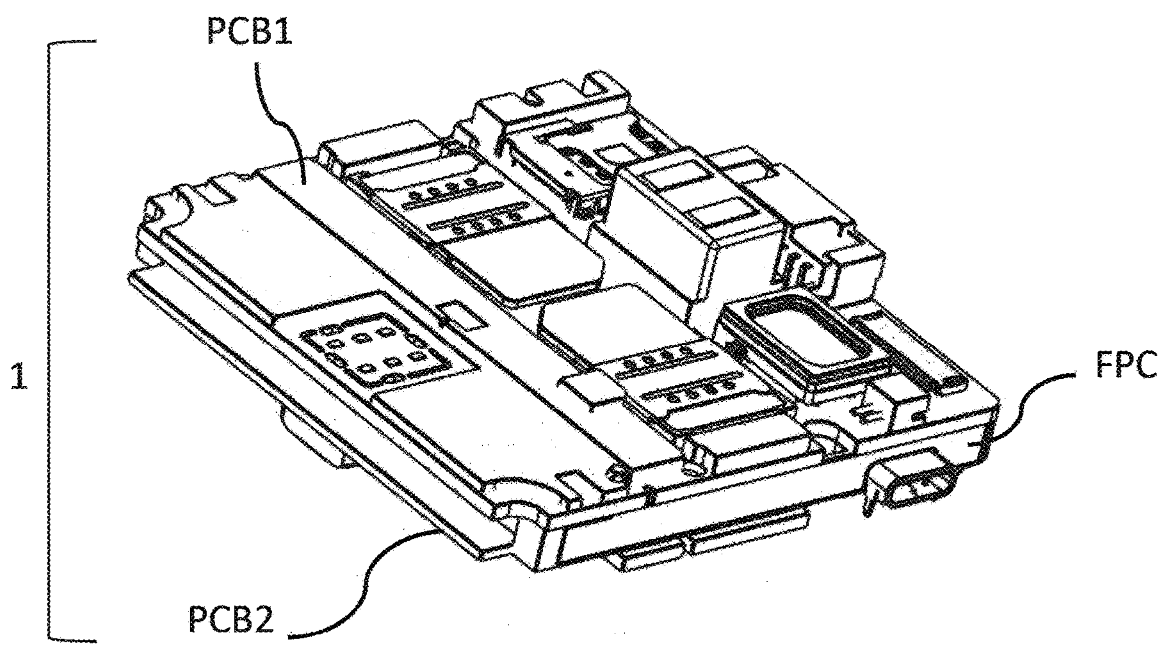
[Fig. 2b]
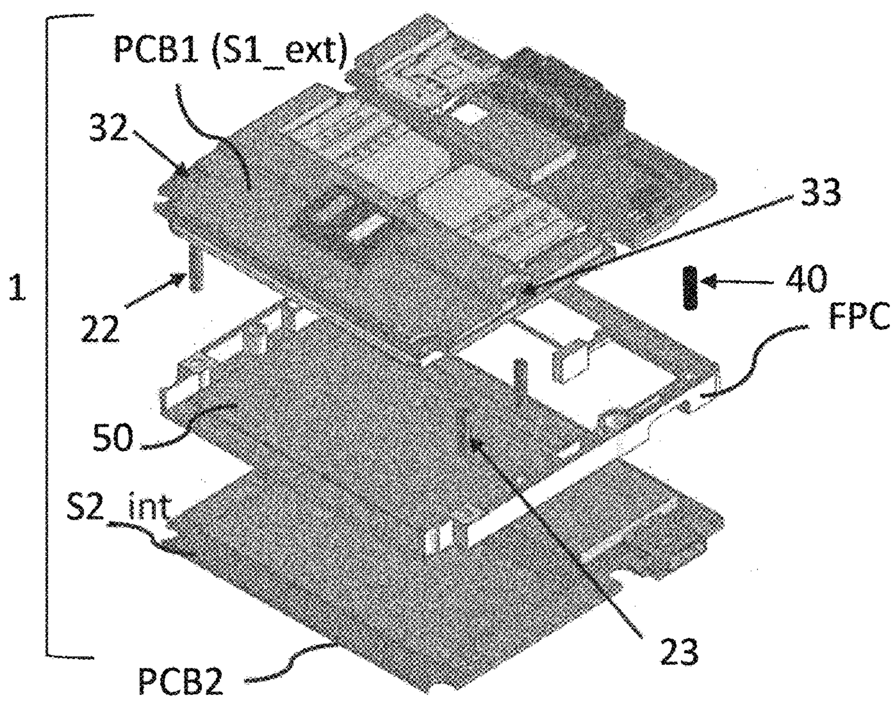

[Fig. 2c]
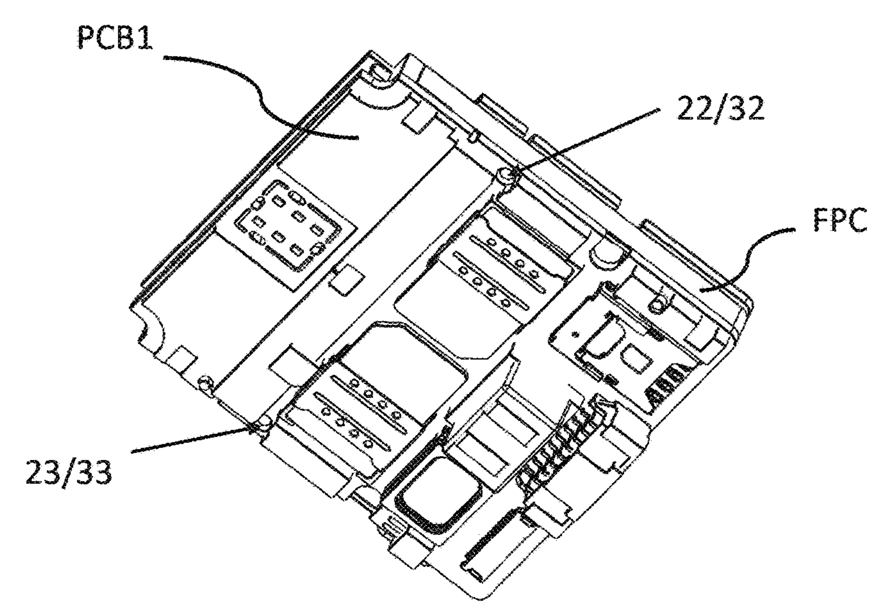
[Fig. 2d]
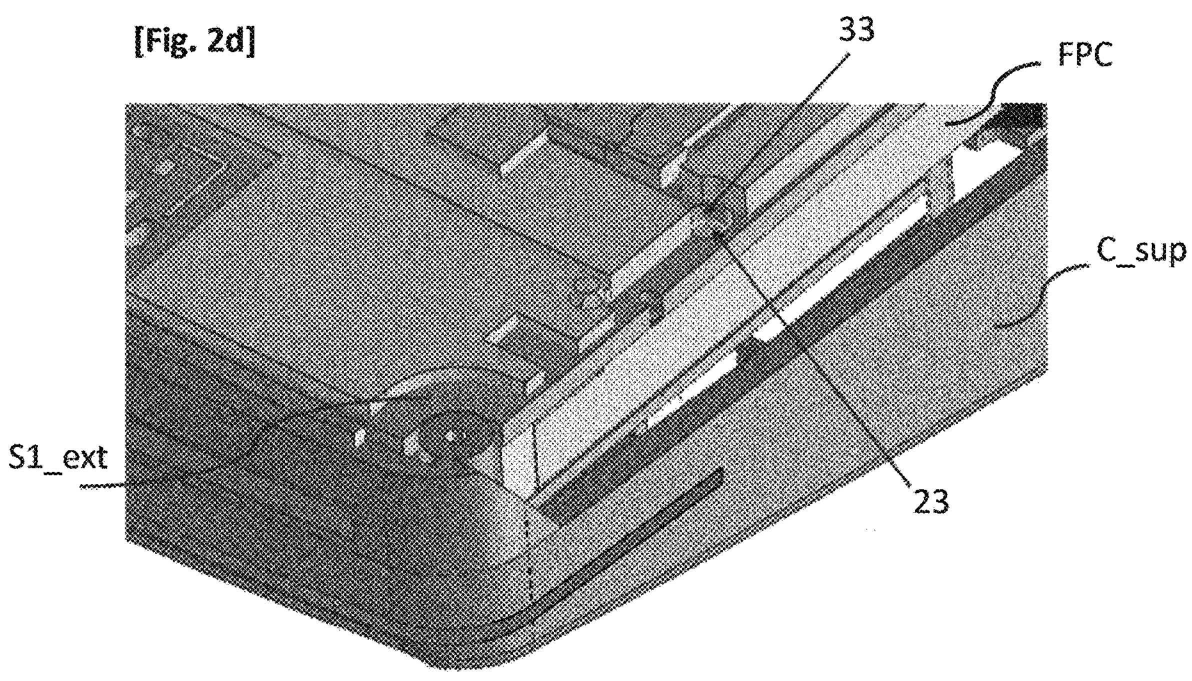

[Fig. 2e]
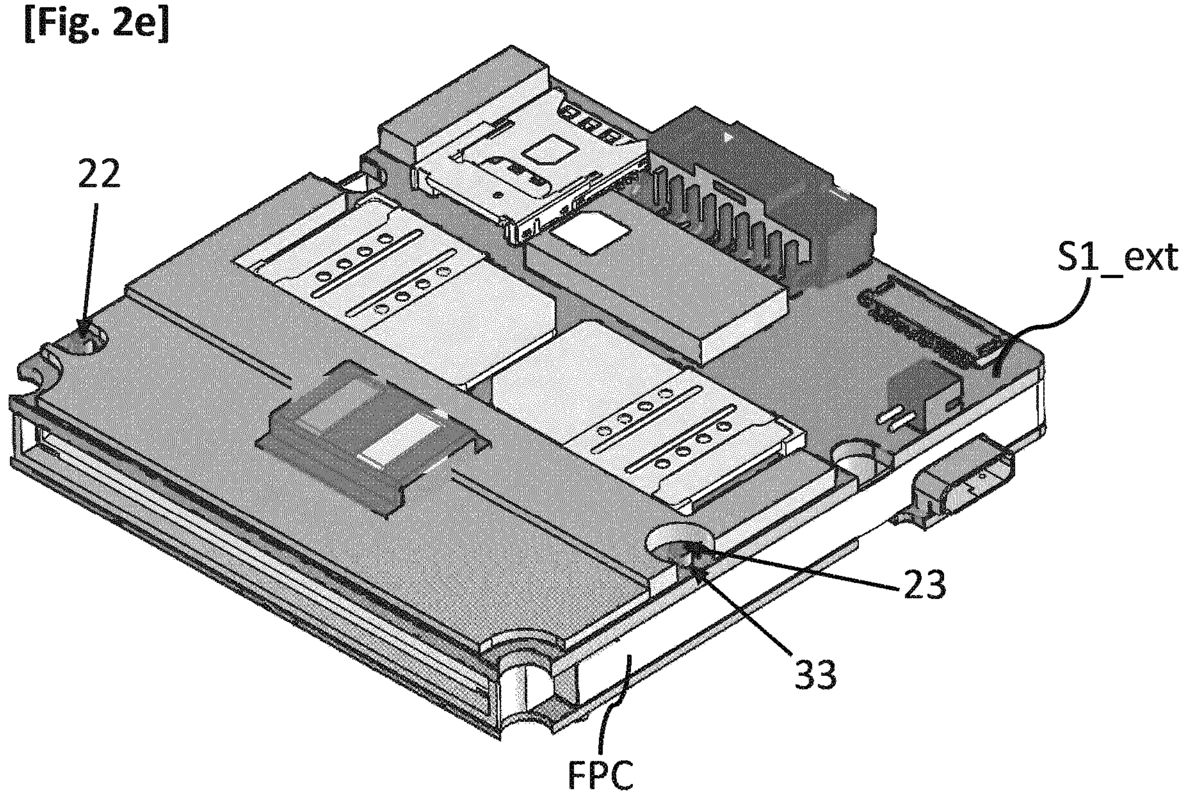

SECURE MODULE, ELECTRONIC PAYMENT TERMINAL, CORRESPONDING DETECTION METHOD

FIELD OF THE INVENTION

The field of the invention is that of electronic devices. The invention relates more particularly to the securing of such electronic devices, for example by detecting opening or intrusion.

The invention thus has many applications, in particular, but not exclusively, in the fields of electronic payment terminals, payment card readers, etc., and more particularly for detecting attempted intrusion into such electronic devices.

Prior Art and Drawbacks Thereof

Accordingly attention is given more particularly in the remainder of this document to describe an existing issue in the field of electronic payment terminals to which the inventors of the present patent application have been confronted.

As payment terminals process sensitive data, it is necessary to protect them against fraud attempts. Thus, hardware and/or software-based protection measures exist. Among the hardware-based protection measures, there are in particular techniques intended to detect opening of the cover of the electronic payment terminal, via for example the implementation of "false keys" in elastomer associated with "carbon pads" or "metal domes", which make it possible to check that the terminal has not undergone an attempt of dismantling.

Indeed, a payment terminal comprises, in a conventional manner, an upper half-shell and a lower half-shell. The upper half-shell comprises openings which are used, for example, to allow the keys of the keyboard and the display screen of the terminal to be surpassed. At the level of the keyboard, the "false keys" devices are used to check that the upper half-shell of the terminal is properly fitted on the one hand in the lower half-shell and on the other hand that the false keys rest on at least one printed circuit board (motherboard) present in the payment terminal. This ensures that the payment terminal is not open and therefore that there is no attempt to introduce a spy device into the keyboard of the payment terminal, for example. The false keys are pressed for example by means of a plastic extension (solid or not) extending from the inside of the upper half-shell to take place on the false key of the printed circuit board (motherboard). This prior art solution is generally quite effective. However, this solution is quite old and not necessarily suitable for new types of payment terminals. Moreover, these "false keys" remain vulnerable to attacks which make it possible to "deactivate" them so as to prevent detecting an intrusion. Thus, it is easily possible, for an attacker, to stick the false key as well as the plastic which holds it then to cut the cover on which it is resting. An attacker therefore has a sub-assembly made up of the printed circuit (for example a PCB or "Printed circuit Board"), the false key and an associated piece of cover, easy to handle. The protection is therefore relatively easy to circumvent, even if it wastes the attacker's time and therefore increases the risks he should take. Similarly, a known type of attack consists, for example, in injecting conductive ink under the "false key", in order to durably close the secure circuit even when the "false key" is no longer constrained by the closing of the housing of the electronic payment terminal.

There is therefore a need for a technique aiming at detecting intrusion and opening of the housing of an electronic device that allows a secure solution that is reliable, simple and inexpensive to implement.

DISCLOSURE OF THE INVENTION

The proposed technique makes it possible to solve at least some drawbacks of the prior art.

The present technique proposes a secure module of an electronic payment terminal comprising a housing formed by at least an upper cover and a lower cover, the secure module comprising at least first and second printed circuits each having an inner side, the inner sides being located facing each another and on which is installed a plurality of electronic components to be secured, and a flexible printed circuit extending from the first printed circuit to the second printed circuit on at least part of their perimeter and forming, with the first and second printed circuits, a secure enclosure for the plurality of electronic components. According to the present technique, the secure module comprises at least one secure element extending from the first printed circuit or the second printed circuit, on which it is connected to at least one circuit for detecting opening of the housing, to the second printed circuit, respectively the first printed circuit, facing a slot passing through the second printed circuit, respectively the first printed circuit, via which said at least one secure element comes into contact with said at least one upper cover or said at least one lower cover when the housing is closed.

Thus, the present technique proposes a new and inventive solution to improve detecting pening of the housing of an electronic payment terminal while facilitating the design, manufacture and assembly of the elements allowing this detection. To this end, at least one secure element making it possible to detect opening of the housing of an electronic payment terminal is integrated into a secure enclosure consisting of two printed circuits positioned facing each other and a flexible printed circuit joining the two printed circuits. This secure element thus extends from one of the printed circuits to the other, through which it leads and is thus in contact (directly or via an actuator or a connecting element) with any one of the covers of the housing of the electronic payment terminal when it is closed.

Thus, the integration of the secure element within the secure enclosure reinforces the reliability of this secure element by reinforcing its invulnerability to external attacks.

According to a particular aspect, the secure module comprises two secure elements for detecting opening of the upper cover and the opening of the lower cover, respectively, both secure elements being denoted upper secure element and lower secure element, the upper secure element extending from the first printed circuit, on which it is connected to at least one circuit for detecting opening of the housing, to the second printed circuit facing a slot passing through the second printed circuit via which the upper secure element comes into contact with said at least one upper cover when the housing is closed and the lower secure element extending from the second printed circuit, on which it is connected to at least one circuit for detecting opening of the housing, to the first printed circuit facing a slot passing through the first printed circuit via which the lower secure element comes into contact with said at least one lower cover when the housing is closed.

Thus, according to this embodiment, two secure elements are provided respectively to detect the opening of the upper cover and of the lower cover. To this end, each of the secure elements is respectively installed on one of the printed circuits and extends to the other by crossing it to lead towards the cover which it secures. This makes it possible to detect separately and distinctly the opening of the upper cover and the opening of the lower cover and thus to reinforce the detection of opening of the housing, regardless of the origin of the intrusion.

According to one particular feature, the secure module comprises two upper secure elements for detecting opening of the upper cover and two lower secure elements for detecting the opening of the lower cover.

Thus, according to this embodiment, there are provided two secure elements for detecting opening of the upper cover and two secure elements for detecting opening of the lower cover, further reinforcing the security of the electronic payment terminal.

According to one variant, said at least one secure element leads through the slot of the first or second printed circuit and protrudes from the outer surface of the first or second printed circuit to come into contact with said at least one upper cover or said at least one lower cover when the housing is closed.

Thus, according to this variant, the secure element has a size greater than the height of the secure enclosure and therefore passes through the hole formed in the printed circuit, through which it leads. The secure element thus protrudes from the outer surface of this printed circuit to be able to come into contact with the upper cover or the lower cover, in order to be able to detect its opening. An advantage of this variant lies in the fact that the contact can be direct between the secure element and the cover whose function is to detect opening.

According to another variant, said at least one secure element is flush with the inner side of the first or second printed circuit and comes into contact with said at least one upper cover or said at least one lower cover when the housing is closed, via at least one connecting element engaged in the slot.

Thus, according to this variant, the secure element has a size smaller than the height of the secure enclosure and therefore does not pass through the hole formed in the printed circuit. The secure element thus does not protrude from the outer surface of this printed circuit and comes into contact with the upper cover or the lower cover via a connecting element provided to detect opening.

This configuration makes it possible in particular to use identical secure elements for detecting opening of the secure enclosure itself and for detecting opening of the housing covers of the electronic payment terminal, thus facilitating the assembly of the electronic payment terminal. Indeed, all the secure elements being of identical size, no prior identification is necessary for their installation in the secure enclosure, unlike the previous variant in which the secure elements of the present technique are larger than those intended to the secure enclosure and must be precisely identified in order to be installed in the correct locations.

For example, said at least one secure element consists of silicone and carbon and/or silicone and a metal part.

The present technique also concerns an electronic payment terminal comprising at least one secure module as previously described.

The present technique also concerns a method for detecting an intrusion in an electronic payment terminal comprising at least one secure module as previously described, comprising a step of detecting an intrusion when at least one contact between one of the secure elements and one of the opening detection circuits is open.

LIST OF FIGURES

Other aims, features and advantages of the invention will appear more clearly upon reading the following description, given by way of simple illustrative and non-limiting example, in relation to the figures, among which:

Figures 1G, 1H:
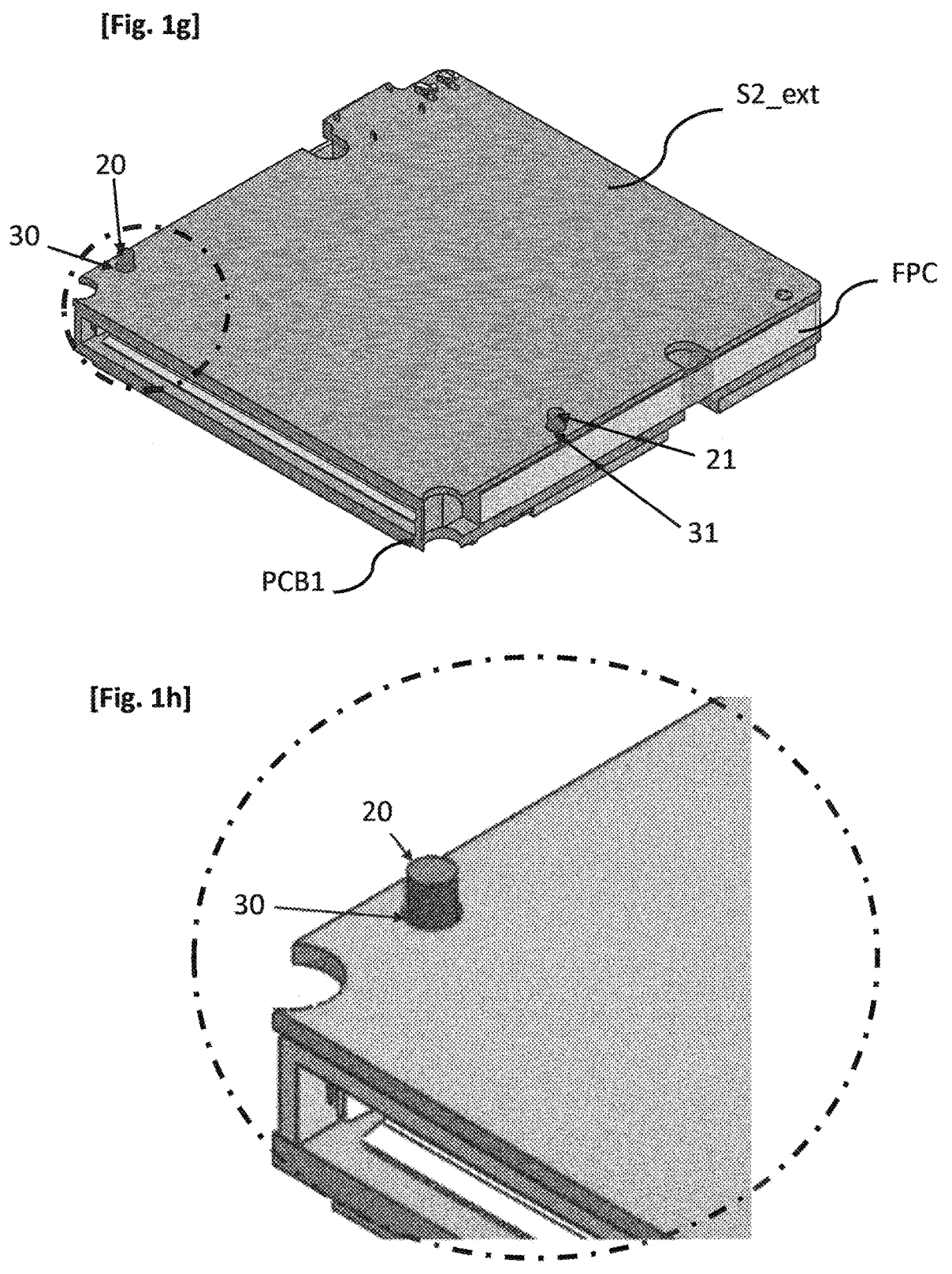

FIG. 1*a* illustrates a perspective top view of a secure module, according to one embodiment of the invention;

FIG. 1*b* illustrates an exploded top view of the secure module of FIG. 1*a*, according to one embodiment of the invention;

FIG. 1*c* illustrates a perspective and transparent top view of the secure module of FIG. 1*a*, according to one embodiment of the invention;

FIG. 1*d* illustrates a perspective top view of the secure module of FIG. 1*a*, integrated into the lower cover of an electronic payment terminal, according to a first variant of the invention;

FIG. 1*e* illustrates the same view as FIG. 1*d*, with the upper cover being transparent, according to a first variant of the invention;

FIG. 1*f* illustrates a close-up view of part of FIG. 1*e;*

FIG. 1*g* illustrates a perspective top view of the secure module of FIG. 1*a*, according to a second variant of the invention;

FIG. 1*h* illustrates a close-up view of part of FIG. 1*g;*

FIG. 2*a* illustrates a perspective bottom view of a secure module, according to one embodiment of the invention;

FIG. 2*b* illustrates an exploded bottom view of the secure module of FIG. 2*a*, according to one embodiment of the invention;

FIG. 2*c* illustrates a perspective and transparent bottom view of the secure module of FIG. 2*a*, according to one embodiment of the invention;

FIG. 2*d* illustrates a perspective bottom view of the secure module of FIG. 2*a*, integrated into the upper cover of an electronic payment terminal, according to a first variant of the invention;

FIG. 2*e* illustrates a perspective bottom view of the secure module of FIG. 2*a*, according to a second variant of the invention.

DETAILED DESCRIPTION OF EMBODIMENTS OF THE INVENTION

The general principle of the proposed technique is based on the implementation, in a secure enclosure (also denoted secure module) of an electronic device, of secure elements intended for detecting an intrusion into the electronic device, and more specifically of an opening of the housing of the electronic device.

The proposed technique allows a secure system of the "false keys" type to detect, in a more secure manner, intrusions by dismantling the housing, by integrating the secure elements forming part of the "false keys" in an enclosure also secured. The vulnerability of these secure elements themselves is therefore greatly reduced.

Moreover, according to one embodiment, the secure elements intended to detect opening of the housing are identical to those used to detect opening of the secure enclosure itself, so as to simplify the assembly of this secure enclosure. and hence of the electronic device.

An embodiment is described hereinbelow in which the secure enclosure is located at the level of the chip card reader of an electronic payment terminal, protecting in particular the sensitive components used to read sensitive data from a chip card used for a transaction implemented by the electronic payment terminal.

This technique can be implemented regardless of the location of the secure enclosure in the electronic payment terminal, depending on the sensitive components to be protected.

As illustrated in particular in FIGS. 1*a* (top perspective view) and 2*a* (bottom perspective view), such a secure enclosure 1 is for example formed of two printed circuits PCB1, PCB2, positioned facing each other and connected by a peripheral or semi-peripheral flexible circuit FPC, making it possible to protect the components installed on the sides facing the printed circuits from external attacks. The flexible circuit FPC is for example bonded to an intermediate rigid structure 50 placed between the two printed circuits PCB1 and PCB2. The components installed respectively on the inner sides (S1_int, S2_int) of the printed circuits PCB1 and PCB2 are therefore protected from external attacks such as those aimed for example at intercepting the signals exchanged between some components by the introduction of a spy probe. The secure enclosure 1 indeed prevents such an intrusion.

Moreover, such a secure enclosure 1 is itself protected against attacks aimed at separating the two printed circuits PCB1 and PCB2 so as to access the sensitive components or the signals that they exchange. For this purpose, secure elements 40 are implemented within the secure enclosure, to detect opening of this enclosure, by separating the two printed circuits forming it. For example, such secure elements have the shape of a cylinder made of a flexible and deformable and sometimes electrically conductive material which makes it possible to bring an external ring and an internal ring into contact on a printed circuit (known principle of "false keys"). When sufficient pressure is exerted on the cylinder (also called "puck"), the electric current passes between the internal ring and the external ring of the false key. When the current passes correctly through this false key, the terminal runs a self-diagnosis (via one or more secure circuit(s)) as being in a correct operating state. It is also possible that the material of the cylinder is not electrically conductive, in which case a metal dome is added to the puck in order to fulfill the function of current conduction between the external ring and the internal ring of the false key. The implementation of such a secure element can also be done, in a known manner, in the form of a carbon pad.

Such secure elements are for example identified with the reference 40 in FIGS. 1*b* and 2*b*, the respective internal and external rings (not illustrated) forming the false key being located on the inner sides S1_int, S2_int of the printed circuits PCB1 and PCB2.

The principle of the present technique is therefore based on the implementation, in such a secure enclosure, of one or more secure element(s), of the same type as those previously described, for detecting opening of the housing of the electronic payment terminal into which the enclosure is integrated. For this purpose, the secure element(s) should not only be connected to a secure circuit on any one of the printed circuits PCB1, PCB2 to generate an alert when an opening is detected, but also to the housing of the electronic payment terminal itself when the latter is closed, via the slots provided in these printed circuits PCB1, PCB2, facing the secure elements. Thus, closing the housing makes it possible to apply pressure to these secure elements and to close the associated secure circuits, such that one or more of these circuits is/are open when the pressure exerted on one or more of these secure elements is no longer sufficient, for example due to an attempt to open the housing.

For a better understanding of the present technique, the embodiment described provides for implementation of two secure elements, denoted upper secure elements 20 and 21, for detecting opening of the upper cover of the housing of the electronic payment terminal as well as two secure elements, denoted lower secure elements 22 and 23, for detecting opening of the lower cover of the housing of the electronic payment terminal. The number of lower/upper secure elements implemented depends on the security level required. Their locations are advantageously chosen in order to detect as accurately as possible any attempt to open any one of the upper and lower covers. For example, for square-shaped printed circuits, it is advantageous to have secure elements at the four corners, so as to detect any titling attempt which would be possible with a single secure element placed in the center of the printed circuit.

FIG. 1*b* therefore illustrates an exploded perspective top view of a secure enclosure according to this embodiment of the present technique. This top view illustrates more particularly the upper secure elements 20 and 21, implemented between the printed circuits PCB1 and PCB2. Their role being to detect opening of the upper cover of the electronic payment terminal, two slots 30, 31 are therefore provided in the printed circuit PCB2, the outer surface S2_ext of which is only visible in this FIG. 1*b*. Thus, according to this embodiment, the secure elements 20 and 21 are installed on the internal side S1_int of the printed circuit PCB1 and extend to the printed circuit PCB2, respectively facing the slots 30 and 31 provided in the printed circuit PCB2 when the secure enclosure 1 is assembled.

FIGS. 1*c* to 1*f* and 1*g* to 1*h* illustrate such an assembled and closed secure enclosure, respectively according to two variants.

According to the first variant illustrated in FIGS. 1*c* to 1*f*, the upper secure elements 20 and 21 do not protrude from the outer surface of the printed circuit PCB2. This is more particularly visible in the close-up view of Figure if (corresponding to the area surrounded by dotted lines in FIG. 1*e*), at the level of the assembly formed by the upper secure element 20 and the corresponding slot 30. In such a configuration, it is necessary to implement a connecting element between the upper cover and the secure element, so that the latter may perform its function of detecting opening of the upper cover. In FIGS. 1*e* and 1*f*, the upper cover C_sup is represented in transparency, via fine black lines, and the connecting element 60 (used to bring the secure element 20 into contact with the upper cover C_sup) is also represented in wireframe model. This connecting element 60 is in the form of a protrusion extending downwards from the inner surface of the upper cover and engaging (inserting) the slot 30 in order to come into contact with the upper secure element 20, when the housing of the electronic payment terminal is closed by assembling in particular the lower and upper covers. This implementation also applies to the second upper secure element 21 (not illustrated in FIG. 1*f*).

Different shapes may be chosen for the connecting element, depending on the shape of the upper cover, the internal configuration of the portion of the electronic payment terminal in which the secure enclosure is integrated and the shape of the upper secure elements 20 and 21 and of the slots 30 and 31.

This first variant offers the advantage of being able to use identical secure elements for detecting an intrusion into the secure enclosure 1 and for detecting opening of the housing of the electronic payment terminal according to the present technique. Thus, the elements 20, 21 and 40 for example, illustrated in FIG. 1*b* are identical in shape and in size, facilitating their assembly. For example, for a distance of 5 mm between the printed circuits PCB1 and PCB2, the secure elements can measure 5.75 mm when they are not constrained. This makes it possible to perform intrusion detection both within the secure enclosure and within the housing.

According to the second variant illustrated in FIGS. 1*g* and 1*h*, the upper secure elements 20 and 21 protrude from the outer surface S2_ext of the printed circuit PCB2, through the slots 30 and 31. This is more particularly visible on the close-up view of FIG. 1*h* (corresponding to the area circled in dotted lines in FIG. 1*g*), at the level of the assembly formed by the upper secure element 20 and the corresponding slot 30. An advantage of this configuration lies in the fact that it is not necessary to implement a connecting element between the upper cover and the secure element, so that the latter may perform its function of detecting opening of the upper cover, because it is possible to bring the end of the upper secure element 20 directly into contact with the inner surface of the upper cover, when the housing of the electronic payment terminal is closed by assembly in particular of the lower and upper covers.

The implementation of the lower secure elements will be now described. Thus, FIG. 2*b* illustrates a perspective exploded bottom view of a secure enclosure according to this embodiment of the present technique. This bottom view illustrates more particularly the lower secure elements 22 and 23, implemented between the printed circuits PCB1 and PCB2. Their role being to detect opening of the lower cover of the electronic payment terminal, two slots 32, 33 are therefore provided in the printed circuit PCB1, the outer surface S1_ext of which is only visible in this FIG. 2*b*. Thus, according to this embodiment, the secure elements 22 and 23 are installed on the internal side S2_int of the printed circuit PCB2 and extend to the printed circuit PCB1, respectively facing the slots 32 and 33 provided in the printed circuit PCB1 when the secure enclosure 1 is assembled.

FIGS. 2*c* to 2*d* and 2*e* illustrate such an assembled and closed secure enclosure, respectively according to the first and second variants of the secure elements described hereinabove for the upper secure elements 20 and 21.

According to the first variant illustrated in FIGS. 2*c* and 2*d*, the lower secure elements 22 and 23 do not protrude from the outer surface S1_ext of the printed circuit PCB1. In such a configuration, it is necessary to implement a connecting element between the lower cover and the secure element, so that the latter may perform its function of detecting opening of the lower cover. This connecting element is not described herein in more detail, nor illustrated, because it has all the features already described hereinabove in relation to detecting opening of the upper cover. It should be recalled, however, that this first variant offers the advantage of being able to use identical secure elements for detecting an intrusion into the enclosure 1 and for detecting opening of the housing of the electronic payment terminal. Thus, the elements 22, 23 and 40 for example, illustrated in FIG. 2*b*, are identical in size and in shape, facilitating their assembly.

According to the second variant illustrated in FIG. 2*e*, the lower secure elements 22 and 23 protrude from the outer surface S1_ext of the printed circuit PCB1, through the slots 32 and 33. As indicated previously, an advantage of this configuration lies in the fact that it is not necessary to implement a connecting element between the lower cover and the secure element, so that the latter may perform its function of detecting opening of the lower cover, because it is possible to bringing the end of the lower secure element 22 (23) directly into contact with the inner surface of the lower cover, when the housing of the electronic payment terminal is closed by assembly in particular of the lower and upper covers.

Thus, the present technique makes it possible to reinforce the security of an electronic device, such as an electronic payment terminal for example, by reinforcing the invulnerability of the secure elements implemented to detect opening of the housing of the electronic payment terminal, by their integration in an enclosure also secured integrated into the electronic payment terminal.

The present technique therefore concerns a method for detecting an intrusion by opening the housing of an electronic payment terminal in which is implemented a secure module, or a secure enclosure, as previously described, and in particular one or more lower/upper secure element(s). This detection method therefore comprises a step of detecting an intrusion when at least one contact between one of the secure elements and one of the opening detection circuits is open, on the principle of false keys.

The invention claimed is:

1. A secure module of an electronic payment terminal, the electronic payment terminal comprising:

a housing comprising an upper cover and a lower cover, first and second printed circuits each having an inner side, the inner sides of the first and second printed circuits being located facing each another, a plurality of electronic components to be secured being installed on the first and/or second printed circuits, and a flexible printed circuit extending from the first printed circuit to the second printed circuit over at least part of their perimeter and forming with the first and second printed circuits a secure enclosure for the plurality of electronic components, the secure module comprising a first secure element extending from the first printed circuit through a hole formed in the second printed circuit, the first secure element coming into contact with the upper cover or the lower cover when the housing is closed, the first secure element being connected to a first detection circuit on the first printed circuit, the first detection circuit being configured to detect opening of the housing.

2. The secure module according to claim 1, wherein:

the first secure element comes into contact with the upper cover for detecting opening of the upper cover, and the secure module further comprises a second secure element for detecting opening of the lower cover, the second secure element extending from the second printed circuit through a hole formed in the first printed circuit, the second secure element coming into contact with the lower cover when the housing is closed, the second secure element being connected to a second detection circuit on the second printed circuit, the second detection circuit being configured to detect opening of the housing.

3. The secure module according to claim 2, comprising two upper secure elements to detect opening of the upper cover and two lower secure elements to detect opening of the lower cover.

4. The secure module according to claim 1, wherein the first secure element leads through the hole of the second printed circuit and protrudes from an outer surface of the second printed circuit to come into direct contact with the upper cover or the lower cover when the housing is closed.

5. The secure module according to claim 1, wherein the first secure element is flush with the inner side of the second printed circuit and comes into contact with the upper cover or the lower cover when the housing is closed, via a connecting element engaged in the hole of the second printed circuit.

6. The secure module according to claim 1, wherein the first secure element is made of silicone and carbon and/or silicone and a metal part.

7. An electronic payment terminal comprising:

a housing comprising an upper cover and a lower cover;

first and second printed circuits each having an inner side, the inner sides of the first and second printed circuits being located facing each another, a plurality of electronic components to be secured being installed on the first and/or second printed circuits;

a flexible printed circuit extending from the first printed circuit to the second printed circuit over at least part of their perimeter and forming with the first and second printed circuits a secure enclosure for the plurality of electronic components; and a first secure element extending from the first printed circuit through a hole formed in the second printed circuit, the first secure element coming into contact with the upper cover or the lower cover when the housing is closed, the first secure element being connected to a first detection circuit on the first printed circuit, the first detection circuit being configured to detect opening of the housing.

8. A method for detecting an intrusion into an electronic payment terminal comprising:

a housing comprising an upper cover and a lower cover, first and second printed circuits each having an inner side, the inner sides of the first and second printed circuits being located facing each another, a plurality of electronic components to be secured being installed on the first and/or second printed circuits, a flexible printed circuit extending from the first printed circuit to the second printed circuit over at least part of their perimeter and forming with the first and second printed circuits a secure enclosure for the plurality of electronic components, and a first secure element extending from the first printed circuit through a hole formed in the second printed circuit, the first secure element coming into contact with the upper cover or the lower cover when the housing is closed, the first secure element being connected to a first detection circuit on the first printed circuit, the first detection circuit being configured to detect opening of the housing, the method comprises detecting an intrusion into the electronic payment terminal when at least one contact between the first secure element and the first detection circuits is open.

9. The electronic payment terminal according to claim 7, wherein:

the first secure element comes into contact with the upper cover for detecting opening of the upper cover, and the electronic payment terminal further comprises a second secure element for detecting opening of the lower cover, the second secure element extending from the second printed circuit through a hole formed in the first printed circuit, the second secure element coming into contact with the lower cover when the housing is closed, the second secure element being connected to a second detection circuit on the second printed circuit, the second detection circuit being configured to detect opening of the housing.

10. The electronic payment terminal according to claim 9, comprising two upper secure elements to detect opening of the upper cover and two lower secure elements to detect opening of the lower cover.

11. The electronic payment terminal according to claim 7, wherein the first secure element leads through the hole of the second printed circuit and protrudes from an outer surface of the second printed circuit to come into direct contact with the upper cover or the lower cover when the housing is closed.

12. The electronic payment terminal according to claim 7, wherein the first secure element is flush with the inner side of the second printed circuit and comes into contact with the upper cover or the lower cover when the housing is closed, via a connecting element engaged in the hole of the second printed circuit.

13. The electronic payment terminal according to claim 7, wherein the first secure element is made of silicone and carbon and/or silicone and a metal part.

14. The secure module according to claim 2, wherein the first secure element leads through the hole of the second printed circuit and protrudes from an outer surface of the second printed circuit to come into direct contact with the upper cover or the lower cover when the housing is closed.

15. The secure module according to claim 2, wherein the first secure element is flush with the inner side of the second printed circuit and comes into contact with the upper cover or the lower cover when the housing is closed, via a connecting element engaged in the hole of the second printed circuit.

16. The secure module according to claim 2, wherein the first secure element is made of silicone and carbon and/or silicone and a metal part.

17. The secure module according to claim 1, further comprising a second secure element extending from the second printed circuit and coming into contact with the upper cover or the lower cover by being inserted into a hole formed in the first printed circuit when the housing is closed, wherein the second secure element is connected to a second detection circuit on the second printed circuit, and the second detection circuit is configured to detect opening of the housing.

* * * * *